(12) United States Patent
Tani et al.

(10) Patent No.: US 6,432,013 B1
(45) Date of Patent: Aug. 13, 2002

(54) POWER TRANSMISSION BELT AND METHOD FOR FABRICATING THE SAME

(75) Inventors: Kazuyoshi Tani; Koji Watanabe; Yoshitaka Kurose, all of Hyogo (JP)

(73) Assignee: Bando Chemical Industries, Ltd., Hyogo (JP)

(*) Notice: Subject to any disclaimer, the term of this patent is extended or adjusted under 35 U.S.C. 154(b) by 0 days.

(21) Appl. No.: 09/572,304

(22) Filed: May 18, 2000

(30) Foreign Application Priority Data

May 24, 1999 (JP) .......................................... 11-143607
May 24, 1999 (JP) .......................................... 11-143618

(51) Int. Cl.[7] ................................................ F16G 5/08
(52) U.S. Cl. ................................................... 474/263
(58) Field of Search ................................ 474/260, 261, 474/263, 191; 156/137, 138, 139, 140, 142, 154

(56) References Cited

FOREIGN PATENT DOCUMENTS

| JP | 3-219147 | 9/1991 |
|---|---|---|
| JP | 3-265741 | 11/1991 |
| JP | 7-4470 | 1/1995 |
| JP | 7-98044 | 4/1995 |
| JP | 7-151191 | 6/1995 |

*Primary Examiner*—David A. Bucci
*Assistant Examiner*—Timothy McAnulty
(74) *Attorney, Agent, or Firm*—Nixon Peabody LLP; Thomas W. Cole

(57) ABSTRACT

Short aramid fibers extruded from a side face of each rib in a V-ribbed belt are formed in curled shape. The root portions of the extruded short aramid fibers are raised from the side face of the rib. The tip portion of each extruded short aramid fiber is bowed in a direction different from a bowing direction of its medial portion. The extruded sections of the short aramid fibers are different in bowing direction from one another to decentralize the orientation thereof.

6 Claims, 14 Drawing Sheets

POWER TRANSMISSION BELT AND METHOD FOR FABRICATING THE SAME

BACKGROUND OF THE INVENTION

This invention relates to a power transmission belt and method for fabricating the same, and particularly relates to a power transmission belt such as a V-ribbed belt or a V-belt including short fibers mixed into its compression rubber and a method for fabricating the same.

As disclosed in Japanese Patent Application Laid-Open Gazettes Nos. 3-219147 and 7-4470, there are conventionally known power transmission belts in which a crowd of short fibers are mixed into their compression rubber in a manner to be oriented along the width of the belt and some of the short fibers are extruded from the surface of the compression rubber. Power transmission belts of such kind aim at enhancing bearing strengths and wearing properties of their friction drive sections and preventing noise production during their running.

However, even such a power transmission belt out of which some of the short fibers extrude, if the total area of extruded sections of the short fibers occupying the surface of the compression rubber is small, cannot enhance its wearing property so much because the area of the compression rubber in direct contact with a pulley becomes correspondingly large.

For the purpose of increasing the exposure areas of short fibers with respect to the surface area of the compression rubber, Japanese Patent Application Laid-Open Gazette No. 1-164839 has proposed a power transmission belt as shown in FIG. 19. In this power transmission belt, extruded sections 102 of short aramid fibers 101 mixed into a compression rubber 100 are 0.065 to 0.13 mm long, longer than those of conventional short fibers, and are bent in a particular direction 103 along a working flank of the belt.

In such a power transmission belt, though the exposure areas of short fibers 101 can be increased, the extruded sections 102 are bent at their roots and therefore made substantially flush with the surface of the compression rubber 100. Accordingly, the extruded sections 102 are difficult to together form surface unevenness as considered as effectively suppressing noise. This invites a problem that the effect of suppressing noise cannot sufficiently be obtained.

Furthermore, since the extruded sections 102 of short fibers are bent in the particular direction 103 along the surface of the compression rubber 100, running the belt in a reverse direction would largely change properties of the belt. Therefore, in order for the belt to obtain its properties as designed, the belt must be checked carefully on its running direction at the time of fitting to pulleys. In addition, this conventional belt is not applicable to devices capable of conveniently switching the running directions of the belt.

Moreover, if the length for which the short fiber is extruded from the surface of the compression rubber 100 is too large, the belt will largely change its properties when the extruded sections 102 are reduced by abrasion. Therefore, considering to maintain desired belt properties constant for a long time, there is a limit to the extruded length of the short fiber. Accordingly, it has been desired to make great strides in enhancing the performance of the belt by improving not only short fibers but also the compression rubber 100.

In view of these problems, an object of the present invention is to provide a power transmission belt excellent in wearing property, hard to produce noise and independent of its running direction.

Another object of the present invention is to further enhance the performance of the belt by improving the surface configuration of the compression rubber.

SUMMARY OF THE INVENTION

To attain the above first object, a power transmission belt of the present invention is constructed so that extruded sections of short fibers are formed in curled shape.

More specifically, a power transmission belt of the present invention is directed to a power transmission belt in which a crowd of short fibers are mixed into a compression rubber thereof in a manner to be oriented in a given direction and some of the short fibers each have an extruded section extruded from a surface of the compression rubber, and is characterized in that the extruded section of the short fiber is raised from the surface of the compression rubber and then bowed.

With this construction, since the extruded sections of the short fibers are bowed, they have sufficiently large exposure areas with respect to the surface area of the compression rubber, resulting in enhanced wearing property of the compression rubber. Further, since some of the short fibers are raised from the surface of the compression rubber, their root portions are not born against but kept off from the surface of the compression rubber. Accordingly, microscopic unevenness is formed over the surface of the compression rubber so that the root portions of short fibers constitute microscopic convexities, thereby suppressing the occurrence of noise.

The extruded section of the short fiber is preferably bowed first in one direction and then another direction on the way from root to tip thereof.

With this construction, when the belt is entrained about a pulley, the short fibers exert restoring forces like a leaf spring on the pulley. As a result, the restoring forces can absorb variations in belt tension associated with the running of the belt. Accordingly, the belt can transmit power with stability, i.e., the belt can stabilize its power transmission performance. Also, though the pressures to be applied to the short fibers will become larger with increase in bearing stress on the surface of the compression rubber, the stresses placed on the root portions of the short fibers can be relaxed by the restoring forces of the bowed portions of the short fibers. Accordingly, the short fibers can be prevented from dropping out of the compression rubber, which enhances the wearing property and elongates the life time of the belt.

At least the tip of the extruded section of the short fiber is preferably flattened. In this case, the surface area of each short fiber can be increased thereby enhancing the wearing property of the belt.

The tip of the extruded section of the short fiber may be cracked. Also in this case, the surface area of each short fiber can be increased thereby enhancing the wearing property of the belt.

The extruded sections of the short fibers are preferably different in bowing direction from one another to decentralize the orientation thereof.

With this construction, since the extruded sections of the short fibers are different in bowing direction from one another to decentralized their orientation, this makes it possible to exhibit the wearing property of the belt uniformly in every direction. Therefore, even if the belt is run in a reverse direction, its properties do not change. In other words, the belt has no dependency on its running direction. Accordingly, the compression rubber of the belt can exhibit uniform bearing strength and wearing property in either running direction independent of the running direction of the belt.

The short fiber may be made of para-aramid fibers or meta-aramid fibers. In these cases, suitable short fibers can be obtained.

To attain the above second object, a power transmission belt of the invention is constructed so that unevenness is provided in the surface of the compression rubber to increase its entire surface area.

Specifically, in the power transmission belt, the surface of the compression rubber is preferably formed in uneven configuration.

With this construction, since the surface of the compression rubber is formed unevenly, its entire surface area can be increased. This enhances the performance of the belt. In addition, clearances are likely to be formed between contact surfaces of the belt and a pulley. Accordingly, even if water or the like enters between the belt and pulley, it can be distributed or discharged through the clearances, which stabilizes frictional resistance of the belt.

The surface unevenness of the compression rubber is preferably formed in wavy shape. Thereby, a suitable uneven configuration can be formed in the surface of the compression rubber.

The surface unevenness of the compression rubber is preferably formed to have a level difference of 0.5 to 10 μm. Also in this case, a suitable uneven configuration can be formed in the surface of the compression rubber.

A method for fabricating a power transmission belt of the present invention is directed to a method for fabricating a power transmission belt in which some of a crowd of short aramid fibers are extruded from a surface of a compression rubber, and is characterized by comprising the step of grinding the compression rubber into which the crowd of short aramid fibers are mixed in a manner to be oriented in a given direction with a grinding wheel having super abrasives extruded for 50 to 95% in grain size thereof from the surface of the grinding wheel.

According to this method, since the height of extrusion of each of the super abrasives is large, a bonding part for the super abrasives in the grinding wheel is prevented from direct contact with the compression rubber of the power transmission belt, there by suppressing production of frictional heat. Accordingly, the grinding step can be carried out under extended conditions such as increase in the grinding speed. Further, the length for which each of the short aramid fibers is extruded from the surface of the compression rubber can be easily increased. This facilitates the bowing of the extruded sections. In addition, such a large height of extrusion of the super abrasive can facilitate to form the surface of the compression rubber into uneven configuration.

Another method for fabricating a power transmission belt of the present invention is also directed to a method for fabricating a power transmission belt in which some of a crowd of short aramid fibers are extruded from a surface of a compression rubber, and is characterized by comprising the step of grinding the compression rubber into which the crowd of short aramid fibers are mixed in a manner to be oriented in a given direction with a grinding wheel having super abrasives the density of which is 3.5 to 55%.

According to this method, since the density of the super abrasives is small, chip pockets can be increased so that grinding chips can be readily expelled. Therefore, clogging between the abrasives due to the chips is difficult to occur. Accordingly, it can be suppressed that such clogging increases grinding load and produces heat in a grinding surface. As a result, the grinding step can be carried out under extended conditions. Further, since the short aramid fibers extruded out of the compression rubber are hardly cut, this facilitates the formation of extruded fiber sections of long length and the bowing of the extruded fiber sections. In addition, such a small density of the super abrasives can facilitate to form the surface of the compression rubber into uneven configuration.

Still another method for fabricating a power transmission belt of the present invention is also directed to a method for fabricating a power transmission belt in which some of a crowd of short aramid fibers are extruded from a surface of a compression rubber, and is characterized by comprising the step of grinding the compression rubber into which the crowd of short aramid fibers are mixed in a manner to be oriented in a given direction with a grinding wheel having super abrasives which are each extruded for 50 to 95% of grain size thereof from the surface of the grinding wheel and the density of which is 3.5 to 55%.

According to this method, since the height of extrusion of each of the super abrasives is large and the density thereof is small, increase in grinding load and heat production in a grinding surface can be suppressed. Accordingly, the grinding step can be carried out under extended conditions. Further, it can be facilitated to increase the length for which each of the short aramid fibers is extruded from the surface of the compression rubber and bow the extruded fiber sections. In addition, since the density of the super abrasives is small, chip pockets are large in size so that grinding chips can be readily expelled. Therefore, clogging between the abrasives due to the chips is difficult to occur.

DESCRIPTION OF THE PREFERRED EMBODIMENTS

Hereinafter, embodiments of the present invention will be described with reference to the drawings.

Embodiment 1

Figure 1:
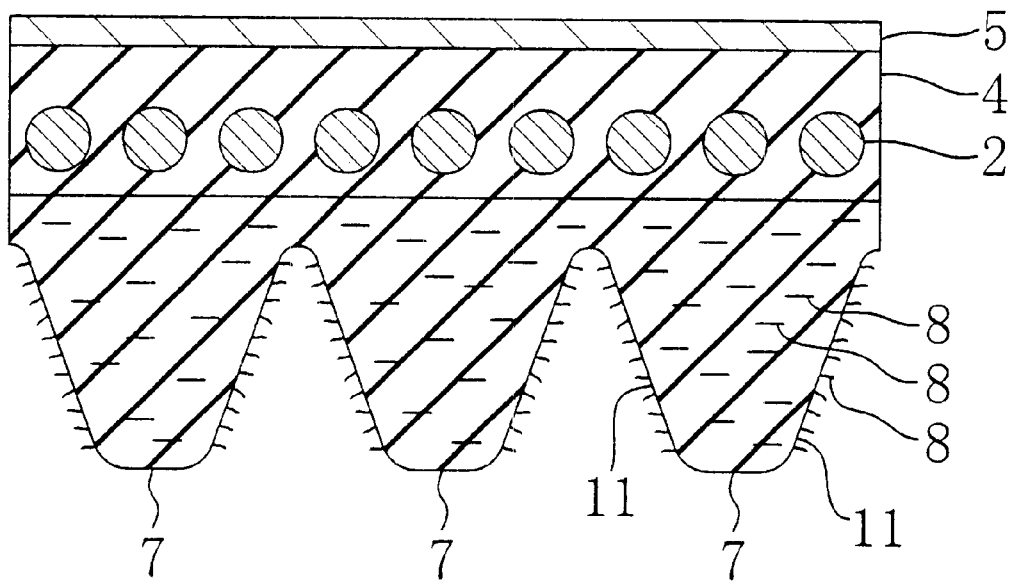
FIG. 1 is a cross-sectional view of a V-ribbed belt according to Embodiment 1 of the present invention.

FIG. 1 shows a cross section of a power transmission belt 10 according to Embodiment 1 of the present invention. The power transmission belt 10 is a V-ribbed belt used for automotive engine auxiliary driving devices or other general industrial applications.

A tension member 2 extending along the length of the belt 10 is embedded in an adhesion rubber layer 4 in a manner to be arranged at regular intervals along the width of the belt 10 (in the lateral direction of FIG. 1). A fabric layer 5 is provided on the upper face side of the adhesion rubber 4, i.e., on the back face side of the belt 10. A plurality of ribs 7, 7, . . . are provided along the width of the belt 10 on the lower face side of the adhesion rubber 4, i.e., on the bottom face side of the belt 10, to extend along the length of the belt 10. The plurality of ribs 7, 7, . . . correspond to a "compression rubber" to which reference has been made in this description. The adhesion rubber layer 4 and the ribs 7 may be made of, for example, chloroprene rubber, H-NBR rubber, CSM rubber, natural rubber, SBR rubber, butadiene rubber, EPM or EPDM.

A plurality of short aramid fibers 8, 8, . . . are embedded in each of the ribs 7, 7, . . . while maintaining their orientation to a given direction. Particularly in this invention, the short aramid fibers 8, 8, . . . are embedded in each of the ribs 7, 7, . . . while maintaining their orientation to the belt widthwise direction. The short aramid fiber 8 may be made of a para-aramid or meta-aramid fiber. In other words, poly-para-phenyleneterephthalamide or poly-meta-phenyleneisophthalamide is applicable for the short aramid fiber 8. More specifically, Kevlar (trademark of E.I. Du Pont de Nemours & Co.), Technora (trademark of Teijin Ltd.), Twaron (trademark of Enka B.V.) or the like maybe used as a para-aramid fiber. Conex (trademark of Teijin Ltd.), Nomex (trademark of E.I. Du Pont de Nemours & Co.) or the like may be used as a meta-aramid fiber.

Figure 2:
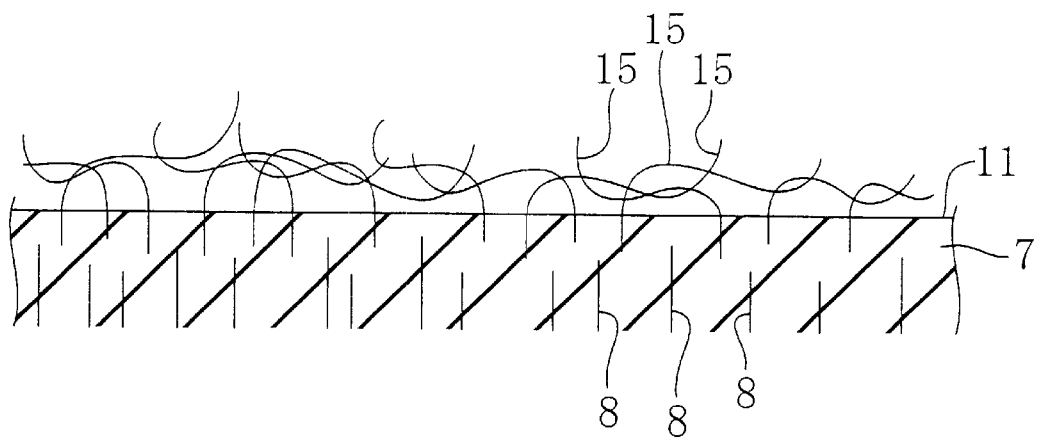
FIG. 2 is a cross-sectional view showing the vicinity of the surface of a rib.

As shown in FIG. 2, some of the short aramid fibers 8, 8, . . . embedded in each of the ribs 7 are extruded from the side face 11 of the rib 7. Extruded sections 15, 15, . . . of the short aramid fibers 8, 8, . . . are bowed over the entire side face 11 of the rib 7 to increase their exposure areas and thereby cover the major part of the side face 11. Further, the extruded sections 15, 15, . . . of the short aramid fibers 8, 8, . . . are bowed not in a single direction but irregularly in multiple different directions. Thus, since the plurality of extruded fiber sections 15, 15, . . . are bowed in various direction to decentralized their orientation, the wearing property of the V-ribbed belt 10 is enhanced uniformly in every direction. Accordingly, the V-ribbed belt 10 is independent of its running direction and can exhibit uniform performance in either running direction.

Figure 3:
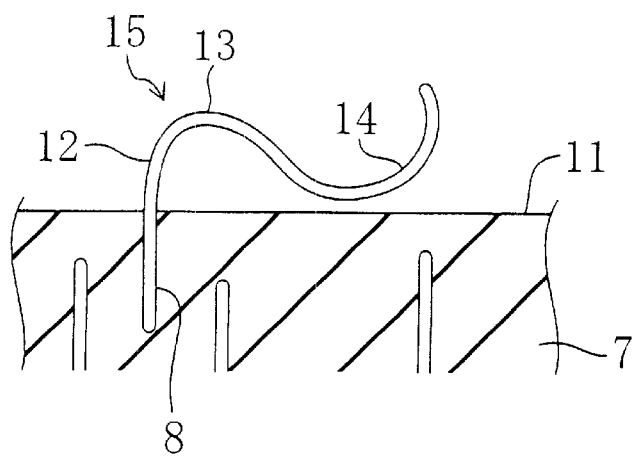
FIG. 3 is a schematic view showing an extruded section of a short aramid fiber.

Next, the shape of the extruded section 15 of each short aramid fiber 8 will be described in detail with reference to FIG. 3. The root portion 12 of the extruded section 15 of the short aramid fiber 8 is raised from the side face 11 of the rib 7. In other words, the root portion 12 of the extruded fiber section 15 is in substantially upright position with respect to the side face 11 of the rib 7. The medial portion 13 of the extruded fiber section 15 is bowed from the end of the root portion 12. The tip portion 14 of the extruded fiber section 15 is bowed in a direction different from the bowing direction of the medial portion 13. For example, in the short aramid fiber 8 shown in FIG. 3, the tip portion 14 is bowed in a direction opposite to the bowing direction of the medial portion 13. Thus, the extruded short aramid fiber 8 is bowed in two steps. Specifically, the extruded section 15 of the short aramid fiber 8 is formed in such a curled shape as bowed first in a certain direction and then opposite direction on its way from root to tip. As a result, the extruded short aramid fiber 8 is kept elevated above the side face 11 of the rib 7. Accordingly, the short aramid fiber 8 can exert a restoring force like a leaf spring in association with its curled shape. In addition, microscopic unevenness can be formed over the side face of the rib 7 so that the root portions 12 of short fibers constitute microscopic convexities.

Figure 4:
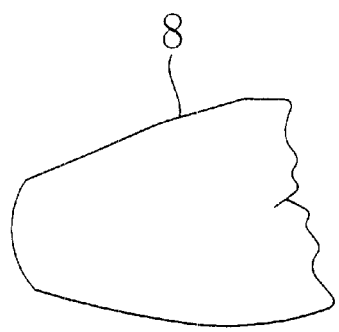
FIG. 4 is a schematic view showing a tip of the extruded section of the short aramid fiber.

The length of the extruded section 15 of the short aramid fiber 8 is preferably 50 μm or less. By friction with a grinding wheel during a grinding process described later, some of the extruded sections 15, 15, . . . of the short aramid fibers 8, 8, . . . are flattened and others are cracked at the tips thereof as shown in FIG. 4.

Fabricating Method of V-ribbed Belt

A method for fabricating the V-ribbed belt 10 will be described next.

First, an unvulcanized rubber sheet for constituting the adhesion rubber layer 4, a cord for constituting the tension member 2 and another unvulcanized rubber sheet into which short aramid fibers are mixed are stacked in this order, and these elements are hot cured thereby obtaining a molded form of belt in cylindrical shape.

Figure 5:
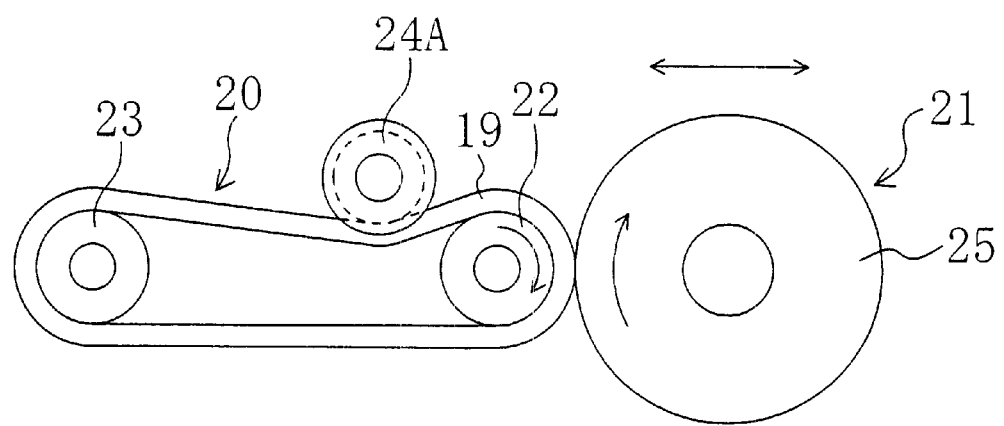
FIG. 5 is a schematic view showing the structure of a grinding apparatus for a V-ribbed belt.

Then, as shown in FIG. 5, the molded form of belt 19 is entrained around main and tension rolls 22, 23 of a drive mechanism 20 and is run by this drive mechanism 20. In the figure, the reference numeral 24A denotes a guide roll. Next, the running molded form of belt 19 is pressed against a grinding wheel 21 driven into rotation thereby grinding the molded form of belt 19. In this case, the short aramid fibers 8 are hardly cut off because of its large greige tensile module and some of them are extruded from the side faces 11 of the ribs 7. Specifically, when each of the extruded short aramid fibers 8 is released from stress induced in its surface by interference with abrasives, it plastically deforms to bow its tip portion.

During this grinding process, the extruded section 15 of the short aramid fiber 8 can be adjusted in its length, shape, degree of flatness and cracked condition of the tip by controlling the type or pressing force of the grinding wheel 21.

Figure 6A:
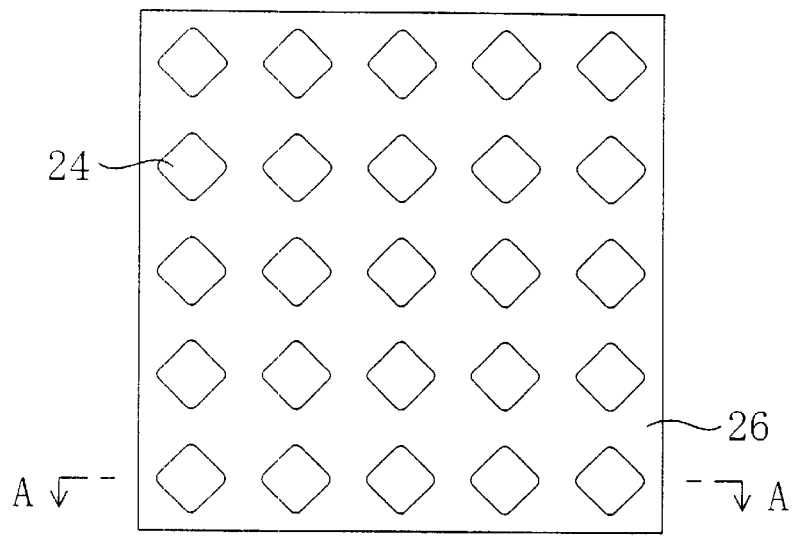
FIG. 6(a) is a partly enlarged plan view showing the periphery of a grinding wheel and FIG. 6(b) is a cross-sectional view taken along the line A—A of FIG. 6(a).
Figure 6B:
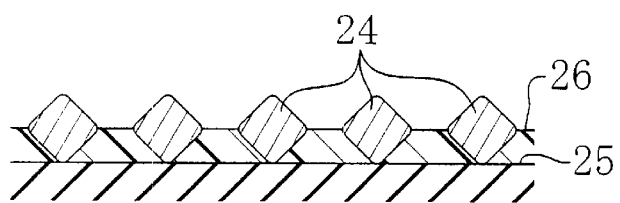

For the grinding wheel 21, use is preferably made of a construction in which diamond abrasives 24 are fixed on the periphery of a disk-like wheel 25 by electroplating, brazing, baking or the like. However, abrasives in the present invention is not limited to diamond abrasives but may be other super abrasives made of, for example, cubic boron nitride (CBN). FIG. 6(a) is a partly vertical projection of the periphery of the wheel 25, and FIG. 6(b) is a cross-sectional view taken along the line A—A of FIG. 6(a). As shown in these FIGS. 6(a) and 6(b), bond (such as metal bond or nickel bond) is spread and coated in a thin layer on the periphery of the wheel 25 (see FIG. 5) to form a bonding part 26.

The diamond abrasives 24 are distributed uniformly in and adhered to the bonding part 26. The grain size of the abrasive 24 is set preferably in the range of #30 to #200, and at #140 in this embodiment. The height of extrusion of each abrasive 24 is set preferably at 50 to 95% of its entire height, and at 80% thereof in this embodiment. The density of the abrasives 24 (the rate at which the total surface area of the abrasives occupies with respect to the entire grinding surface area) is set preferably in the range of 3.5 to 55%, and at 45% in this embodiment.

The rotation of the wheel 25 in the grinding process is made preferably at a peripheral speed of between 500 and 2000 m/min, and at a peripheral speed of 1000 m/min in this embodiment. The grinding speed ratio Vs/Vw, which is a ratio of the peripheral speed Vs of the grinding wheel 21 to the peripheral speed Vw of the belt 19, is set preferably in the range of 0.002 to 0.04, and at 0.004 in this embodiment.

Effects of this Embodiment

As can be seen from the above, since the extruded sections 15 of the short aramid fibers 8 in the V-ribbed belt 10 are plastically deformed into bowed shape, the total surface area of the extruded short aramid fibers 8 is large with respect to the area of the side face 11 of the rib 7. This enhances the wearing property of the V-ribbed belt 10.

Further, since some of the extruded short aramid fibers 8 are flattened or cracked at their tips, they further increase their surface areas. This further enhances the wearing property of the V-ribbed belt 10. If a short fiber is fibrillated at its end, its intrinsic strength maybe impaired. The short fibers in this embodiment, however, are cracked without fibrillation. That is, the crack of the short aramid fiber 8 in this inventive belt 10 is a line of the short fiber broken at a more macroscopic level than fibrillated. Accordingly, the short aramid fibers 8 are not impaired in their intrinsic strengths.

Since the short aramid fibers 8, 8, . . . are bowed in multiple directions, their performance can be exhibited independent of the running direction of the belt 10. Therefore, when the belt 10 grips or moves away from a pulley, stable frictional resistance can be established in friction surfaces of the belt 10 and the pulley. As a result, variations in frictional resistance can be reduced thereby stabilizing the running of the belt 10. Accordingly, the V-ribbed belt 10 in this embodiment can exhibit bearing strength and wearing property uniformly in either running direction.

Since the medial and tip portions 13, 14 of the extruded section 15 of the short aramid fiber 8 are bowed in different directions, the extruded section 15 of the short aramid fiber 8 has a restoring force like a leaf spring. As a result, the restoring forces of the short aramid fibers 8 can absorb variations in pressure applied to the V-ribbed belt 10. Accordingly, the running of the belt 10 is further stabilized so that the belt 10 can transmit power with increased stability. In addition, the restoring forces can relax the stresses placed on the root portions 12 of the extruded short aramid fibers 8. Accordingly, the short aramid fibers 8 can be prevented from dropping out thereby suppressing deterioration of the V-ribbed belt 10.

Since the root portions 12 of the extruded short aramid fibers 8 are raised from the side face 11 of the rib 7, microscopic unevenness is formed over the side face 11 of the rib 7 so that the root portions 12 constitute microscopic convexities. This enables to effectively prevent the occurrence of noise. According to the method for fabricating a V-ribbed belt in this embodiment, since grinding is made using super abrasives each extruded for 50 to 95% of their grain size from the bonding part 26, a contact between the boding part 26 and the rib 7 is hard to occur during grinding. Therefore, an amount of heat produced by friction is small, which enables successful grinding. Further, since diamond of relatively high heat conductivity is used as a material of super abrasives, heat production can be effectively suppressed.

Since the density of super abrasives is relatively as low as 3.5 to 55%, clearances between the abrasives, i.e., chip pockets, are large in size. Therefore, clogging between the abrasives due to the chips is difficult to occur during grinding. Accordingly, heat production due to such clogging hardly occur, which enables successful grinding.

Furthermore, since use is made of the wheel 25 with super abrasives having a large height of extrusion and a small density, the short aramid fibers 8 can be easily extruded for relatively large lengths from the side face 11 of the rib 7. In addition, the extruded section 15 can be easily formed in curled shape with its root portion 12 assuming an upright position.

Performance Comparison

Figure 7:
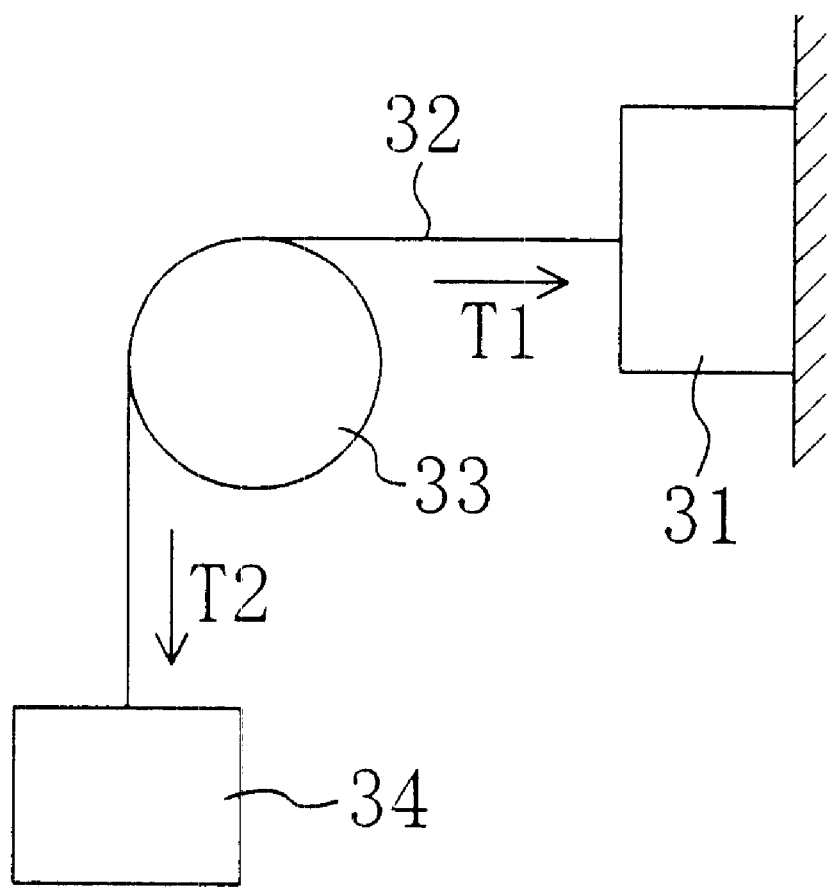
FIG. 7 is a schematic view showing the structure of a testing device for a performance comparison test.

Next, description will be made about a performance comparison test for comparing performances of the V-ribbed belt 10 in this embodiment and a conventional V-ribbed belt. As the conventional V-ribbed belt, use was made of a V-ribbed belt in which extruded short aramid fibers extend linearly. In this test, a weight weighing W was suspended from a load cell 31 through a guide roller 33 by a sample belt 32 as shown in FIG. 7, respective tensions T1 and T2 at tight and slack sides of the belt 32 were measured by detecting a value of the load cell 31, and changes of the ratio (tension ratio) T1/T2 with time were determined. It is to be noted that the tension ratio T1/T2 provides an indication of the coefficient of friction $\mu=(1/\pi)\ln(T1/T2)$.

Figure 8:
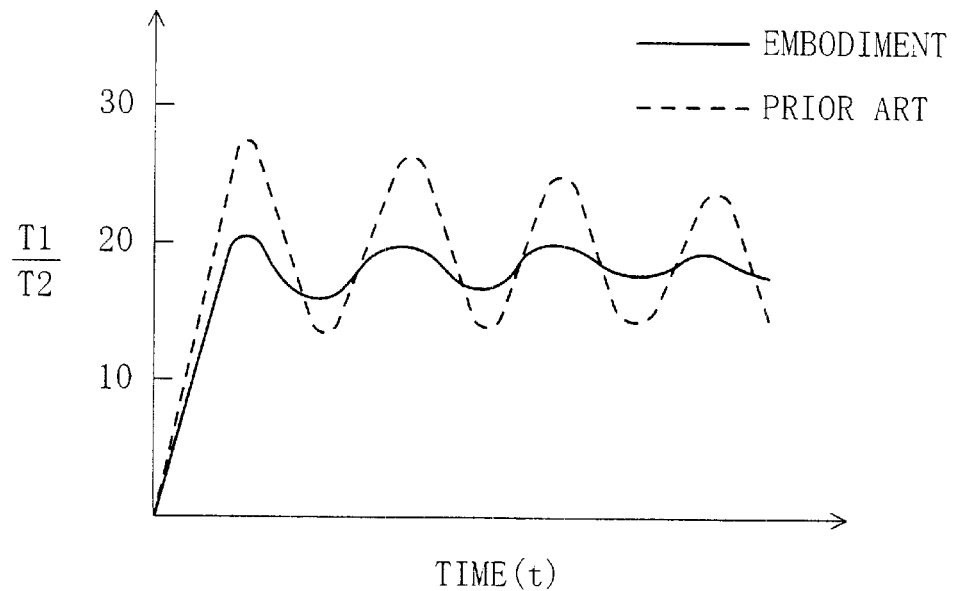
FIG. 8 is a graphic representation of performance comparison of inventive and prior-art V-ribbed belts with reference to variations in tension ratio in their initial conditions.
Figure 9:
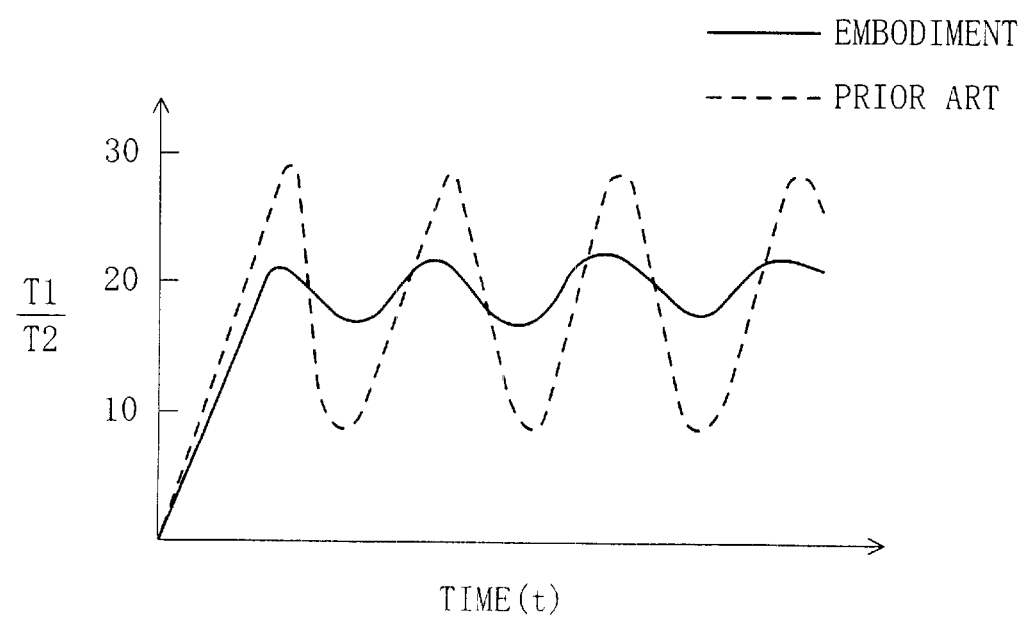
FIG. 9 is a graphic representation of performance comparison of the inventive and prior-art V-ribbed belts with reference to variations in tension ratio in their conditions where the belts have been continuously run for 24 hours.

As shown in FIG. 8, the test results showed that the V-ribbed belt 10 in this embodiment decreased variations of the tension ratio T1/T2 as compared with conventional one. Further, a comparison of the tension ratios T1/T2 of both the belts having been continuously run for 24 hours showed that the V-ribbed belt 10 in this embodiment was smaller in variations of the tension ratio T1/T2 as compared with conventional one, as shown in FIG. 9. Accordingly, it can be understood that the V-ribbed belt 10 in this embodiment is excellent not only in initial performance but also in performance after its running as compared with the conventional V-ribbed belt.

The reason for this seems as follows. Since the conventional V-ribbed belt has its extruded short aramid fibers oriented in a single direction, its frictional resistance is stable with respect to a normal direction but tends to increase with respect to a reverse direction. Therefore, if tension applied to the belt is changed from the normal direction to the reverse direction, frictional resistance of the belt is largely changed even by a slight variation of tension, resulting in inducing a large variation of tension. On the other hand, since the V-ribbed belt 10 in this embodiment has its extruded short aramid fibers 8, 8, . . . irregularly bowed in multiple directions, a change of its frictional resistance associated with a slight variation of tension is small. Accordingly, the variation of tension is not increased and the tension ratio is stable.

Figure 10:
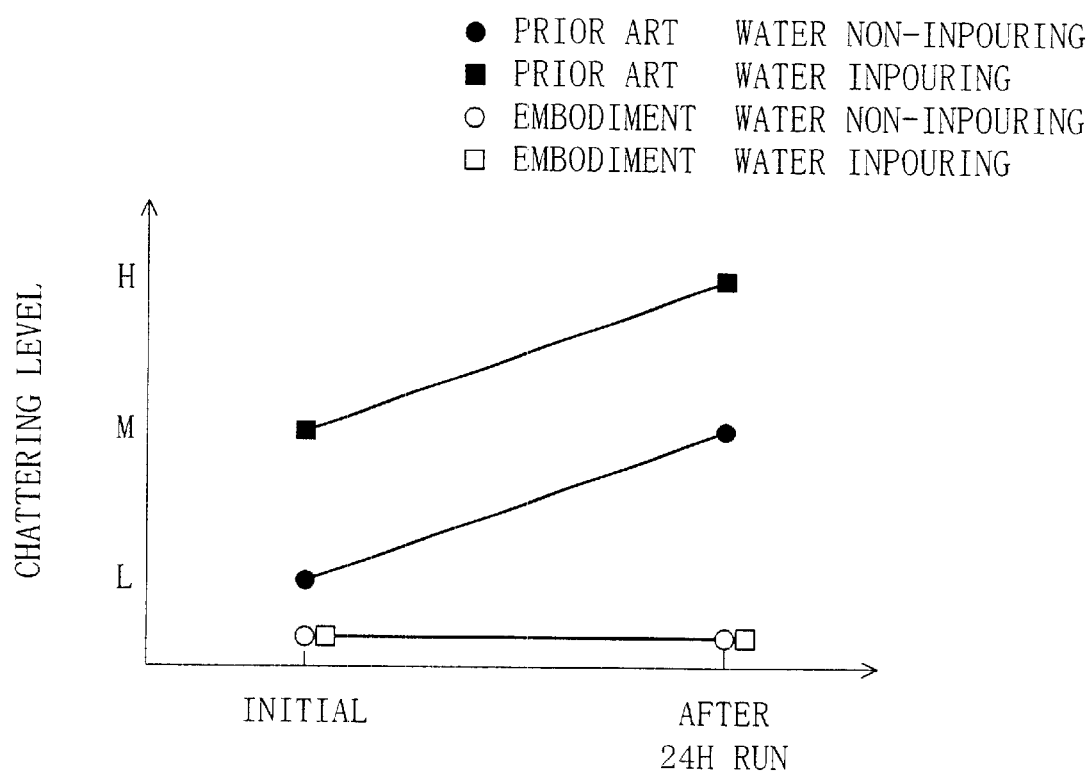
FIG. 10 is a graphic representation of performance comparison of the inventive and prior-art V-ribbed belts with reference to chattering.

Meanwhile, if a variation of frictional resistance of the belt is large, the belt is easy to cause chattering. Another performance comparison test was conducted for belt chattering at the start of running with the use of the V-ribbed belt in this embodiment and a conventional V-ribbed belt in which extruded short aramid fibers were bent in a given direction. Since a belt may be used under conditions where water or oil enters between its rib and a pulley depending upon use environments, measurements of chattering of both the V-ribbed belts were made not only in their initial conditions but also under water-inpouring conditions. As shown in FIG. 10, the test results showed that the V-ribbed belt 10 in this embodiment caused very small chattering. The main reason for this seems that the V-ribbed belt 10 in this embodiment has a small amount of variation in tension ratio as described above.

The test results also showed that while the conventional belt increased the chattering level under water-inpouring conditions, the V-ribbed belt 10 in this embodiment was low in chattering level even under the same conditions. The reason for this seems as follows. Since the short aramid fibers 8 of the V-ribbed belt 10 in this embodiment have extruded sections 15 formed in curled shape and upright root portions 12, water pouring onto the side face 11 of the rib 7 readily passes through clearances between the root portions 12 of the short aramid fibers 8. Accordingly, water is hardly retained on the side face 11 of the rib 7 and readily smoothly discharged therefrom. For this reason, it seems that the occurrence of chattering in the V-ribbed belt 10 of this embodiment is suppressed also under water-inpouring conditions in contrast to the conventional belt.

Embodiment 2

Figure 11:
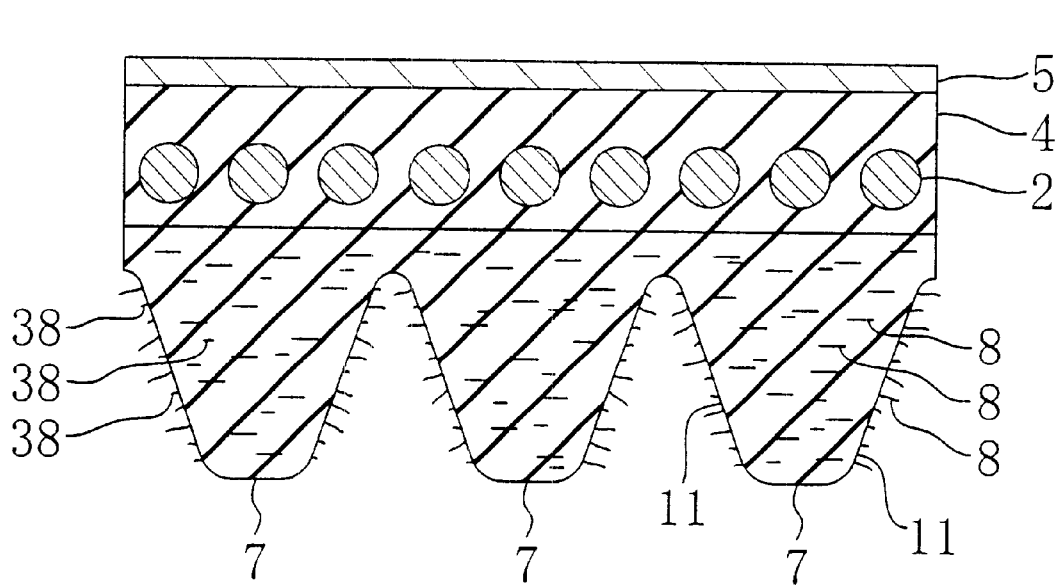
FIG. 11 is a cross-sectional view of a V-ribbed belt according to Embodiment 2 of the present invention.

FIG. 11 shows a cross section of a power transmission belt 10 according to Embodiment 2 of the present invention.

In this embodiment, a plurality of short aramid fibers 8, 8, . . . and a plurality of non-aramid synthetic fibers 38, 38, . . . are mixed into each of ribs 7 while maintaining their orientation to a given direction. Particularly in this embodiment, short aramid fibers 8 and non-aramid synthetic fibers 38 are embedded into the ribs 7 while maintaining their orientation to a belt widthwise direction (lateral direction in FIG. 11).

Like Embodiment 1, the short aramid fiber 8 may be made of a para-aramid or meta-aramid fiber. For the synthetic fiber 38, suitable use can be made of nylon, vinylon, polyester or the like with a filament diameter of 20 μm or more.

Figure 12:
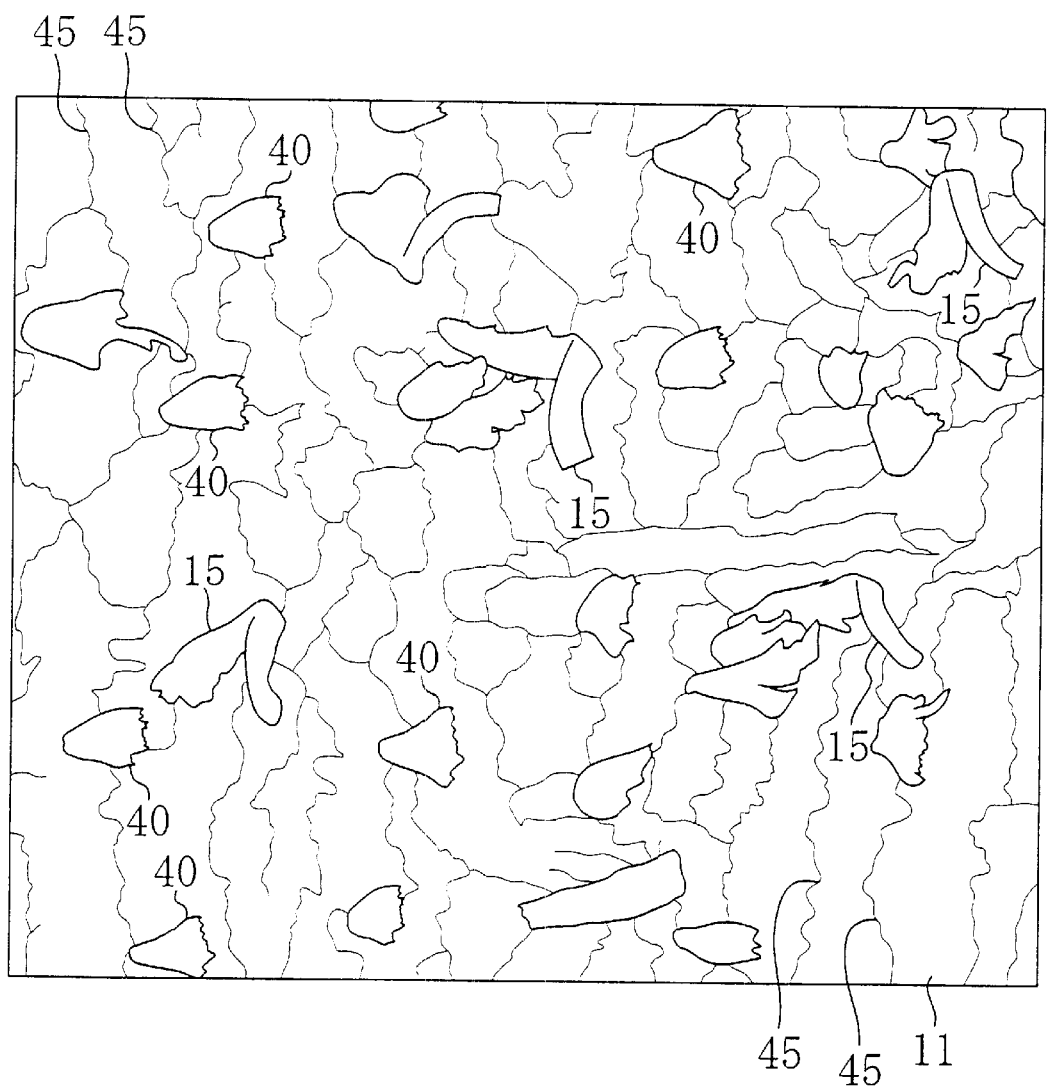
FIG. 12 is an enlarged view of the surface of a rib.
Figure 13:
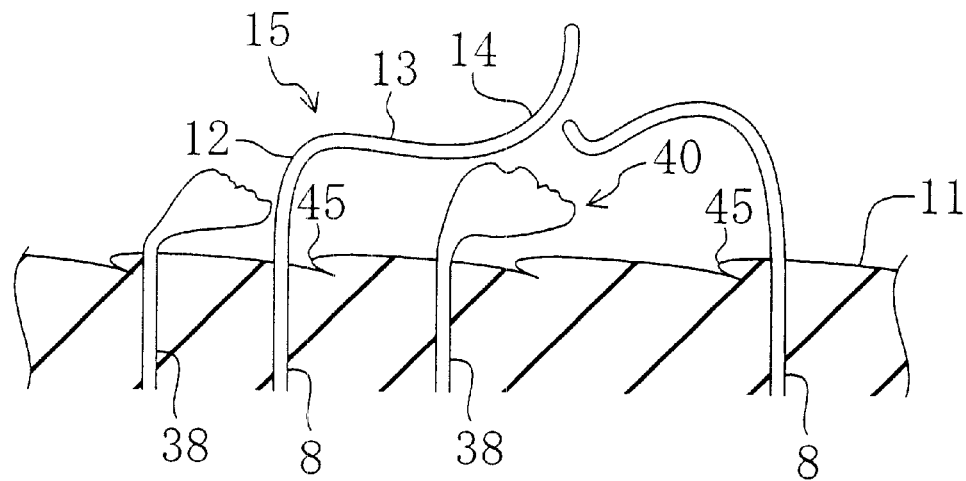
FIG. 13 is an enlarged cross-sectional view showing an example of the vicinity of the surface of the rib.
Figure 14:
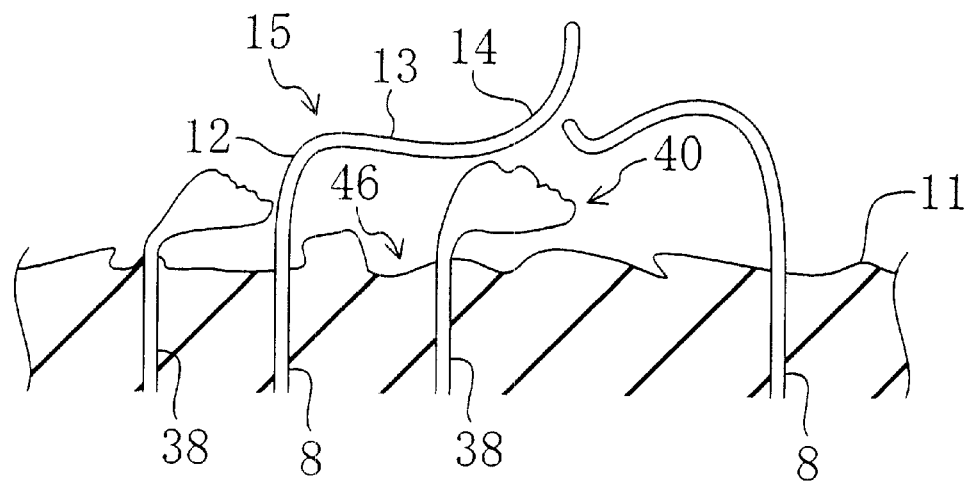
FIG. 14 is an enlarged cross-sectional view showing another example of the vicinity of the surface of the rib.

As shown in. FIGS. 12 and 13, microscopic unevenness (for example, with a level difference of 0.5 to 10 μm) is formed in the surface 11 of the rib 7. In this embodiment, the surface unevenness of the rib is formed in such a configuration that a plurality of waves are traveled in a single direction by a wind, i.e., in wavy shape. However, it goes without saying that the surface unevenness of the rib in the present invention is not limited to such wavy shape but maybe an uneven configuration 46 in which peaks and valleys are alternately disposed as shown in FIG. 14 or other uneven configurations.

As shown in FIGS. 12 and 13, some of the crowd of short aramid fibers 8, 8, . . . embedded in each of the ribs 7 are extruded from the surface 11 of the rib 7. An extruded section 15 of each short aramid fiber 8 is bowed to increase its apparent surface area per unit extruded height. Further, the extruded sections 15, 15, . . . of the short aramid fibers 8, 8, . . . are bowed not in the same direction but randomly in multiple directions. Since the extruded fiber sections 15, 15, . . . are thus bowed in various directions to decentralized their orientation, the bearing strength and wearing property of the V-ribbed belt 10 are enhanced uniformly in every direction like Embodiment 1. Accordingly, the V-ribbed belt 10 is independent of its running direction and can exhibit uniform performance in either running direction.

As shown in FIG. 13, the extruded section 15 of each aramid fiber 8 in this embodiment has the same configuration as that in Embodiment 1. Furthermore, in this embodiment, some of the crowd of synthetic fibers 38, 38, . . . embedded in each of the ribs 7 are also extruded from the side face 11 of the rib 7. However, extruded sections 40, 40, . . . of the synthetic fibers 38, 38, . . . are inclined in a given direction unlike the extruded sections 15, 15, . . . of the short aramid fibers 8, 8, . . . Specifically, each of the extruded sections 40 is inclined in a direction opposed to wave fronts 45 in the wavy-shaped side face 11 of each rib 7. And, the extruded section 40 of the synthetic fiber 38 is formed in a sector gradually flattened and broadened toward its end. The corners of the sector are rounded to present gently curved surfaces. Also, the extruded section 40 of the synthetic fiber 38 is kept in non-melting condition and formed at its end in the shape of waves.

As shown in FIG. 13, the root portion of the extruded section 40 of the synthetic fiber 38 is likewise raised from the side face 11 of the rib 7. As a result, microscopic unevenness can be also formed over the surface of the rib 7 so that the extruded sections 15, 40 of short aramid fibers 8 and synthetic fibers 38 constitute microscopic convexities and surface regions adjoining places where the short fibers 8, 38 are implanted constitute microscopic concavities, separately from the microscopic unevenness formed in the side face 11 of the rib 7.

Fabricating Method of V-ribbed Belt

The V-ribbed belt 10 in this embodiment is fabricated in the following manner.

First, an unvulcanized rubber sheet for constituting a adhesion rubber layer 4, a cord for constituting a tension member 2 and another unvulcanized rubber sheet into which short aramid fibers and synthetic fibers are mixed are stacked in this order, and these elements are hot cured thereby obtaining a molded form of belt in cylindrical shape.

Then, in the same manner as in Embodiment 1 (see FIG. 5), the molded form of belt 19 is entrained around main and tension rolls 22, 23 of a drive mechanism 20 and is run by this drive mechanism 20. Next, the running molded form of belt 19 is pressed against a grinding wheel 21 driven into rotation thereby grinding the molded form of belt 19. In this case, the short aramid fibers 8 are hardly cut off because of its large greige tensile module and some of them are extruded for relatively large lengths from the side faces 11 of the ribs 7. Further, some of the synthetic fibers 38 are extruded in positions inclined reversely to the belt running direction. Specifically, each of the extruded short aramid fibers 8 and synthetic fibers 38 is released from stress induced in its surface by interference with abrasives thereby plastically deforming. Then, the surface of each rib 7 is formed in the shape of waves such that their wave fronts 45 are directed to the direction of rotation of the grinding wheel 21.

During this grinding process, the extruded configurations of the short aramid fiber 8 and synthetic fiber 38 and the uneven surface configuration of the rib 7 can be adjusted by controlling the type or pressing force of the grinding wheel 21. In this embodiment, grinding is made under the same conditions and with the same grinding wheel 21 as used in Embodiment 1.

Effects of this Embodiment

According to the V-ribbed belt 10 in this embodiment as described above, since microscopic unevenness is formed in the side face 11 of each rib 7, the surface area of the rubber portion of the rib 7 is large. This enables to reduce bearing stress on the surface of the rubber portion. Accordingly, wear of the rubber portion can be suppressed, resulting in improved friction property and elongated life time of the belt.

If water or oil enters between a pulley and a belt, frictional resistance of the belt generally becomes unstable. In the V-ribbed belt 10 of this embodiment, however, microscopic unevenness is formed over the side face 11 of each rib 7. Accordingly, microscopic clearances are formed between the belt and a pulley. Therefore, water or the like is distributed among the clearances and then readily discharged through the clearances, which stabilizes frictional resistance of the belt.

Since the short aramid fibers 8 and synthetic fibers 38 are extruded from the side face 11 of each rib 7, the rib 7 itself is hardly worn and its surface is hardly flattened. Accordingly, the belt can exhibit for a long time the above effects obtained by forming the rib surface into uneven configuration.

Further, each rib 7 has unevenness in the side face 11 itself. Therefore, even if the rib 7 itself is worn due to extended periods of use, the belt can be expected to continue to exhibit the above effects unless the uneven surface has been worn out into flatness. Accordingly, the V-ribbed belt 10 in this embodiment can retain its high performance for a long time.

Performance Comparison

Figure 15:
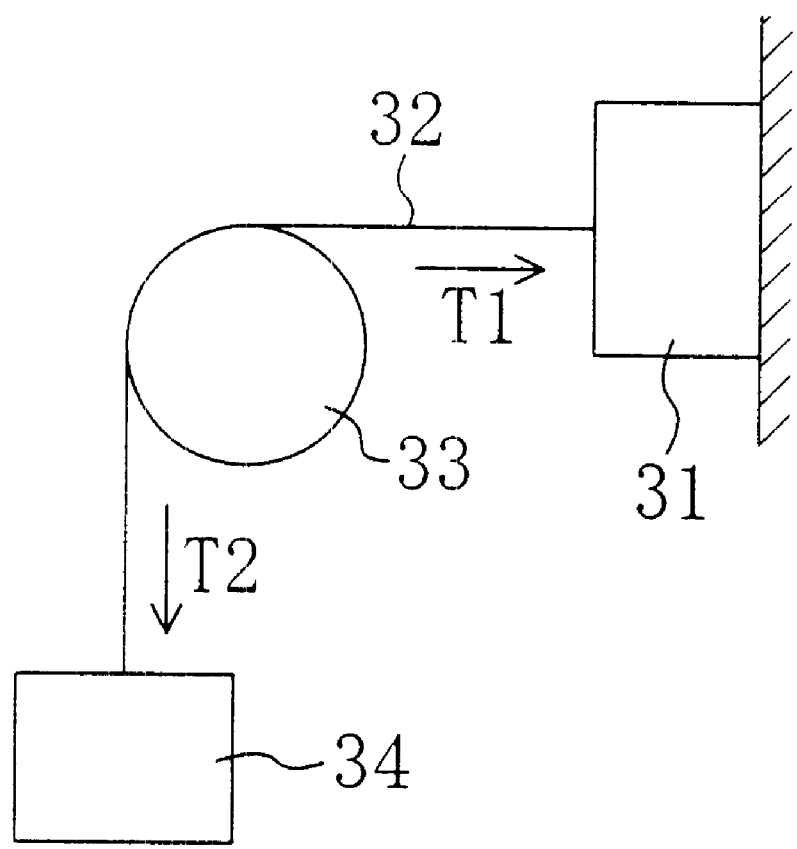
FIG. 15 is a schematic view showing the structure of a testing device for another performance comparison test.

Next, description will be made about a performance comparison test for comparing performances of the V-ribbed belt 10 in this embodiment and a V-ribbed belt (comparative example) in which the side face 11 of each rib 7 is formed with no unevenness. In this test, a weight weighing W was suspended from a load cell 31 through a guide roller 33 by a sample belt 32 as shown in FIG. 15, respective tensions T1 and T2 at tight and slack sides of the belt 32 were measured by detecting a value of the load cell 31, and a frictional force of the belt 32 was determined from the ratio (tension ratio) T1/T2.

Figure 16:
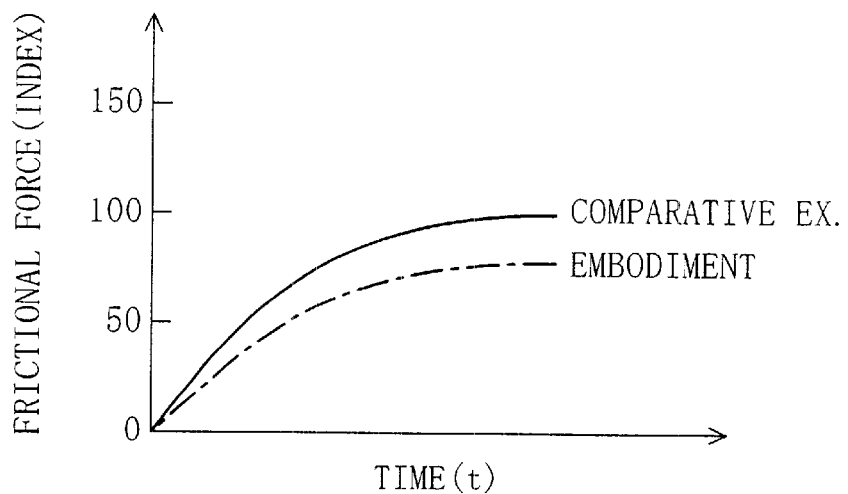
FIG. 16 is a graphic representation of performance comparison of inventive and comparative V-ribbed belts with reference to frictional forces.
Figure 17:
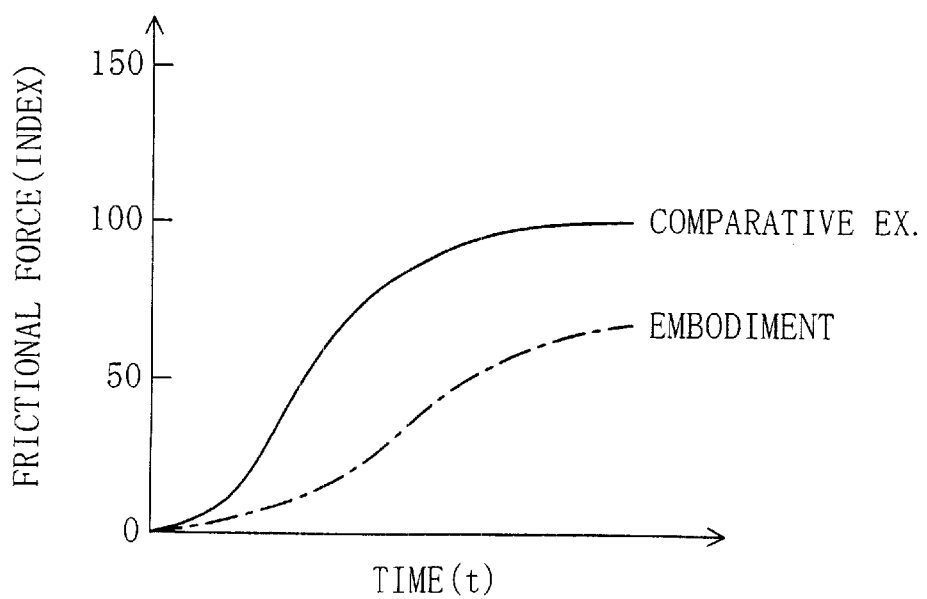
FIG. 17 is a graphic representation of performance comparison of the inventive and comparative V-ribbed belts with reference to frictional forces under water-inpouring conditions.

As shown in FIG. 16, the test results showed that the V-ribbed belt 10 in this embodiment was about 25% smaller in frictional force than the comparative example. Further, the same test was conducted under the conditions where water was inpoured between the guide roller 33 and the sample belt 32. The test result showed that, as shown in FIG. 17, the V-ribbed belt 10 in this embodiment was about 30% smaller in frictional force than the comparative example.

Modifications

Figure 18:
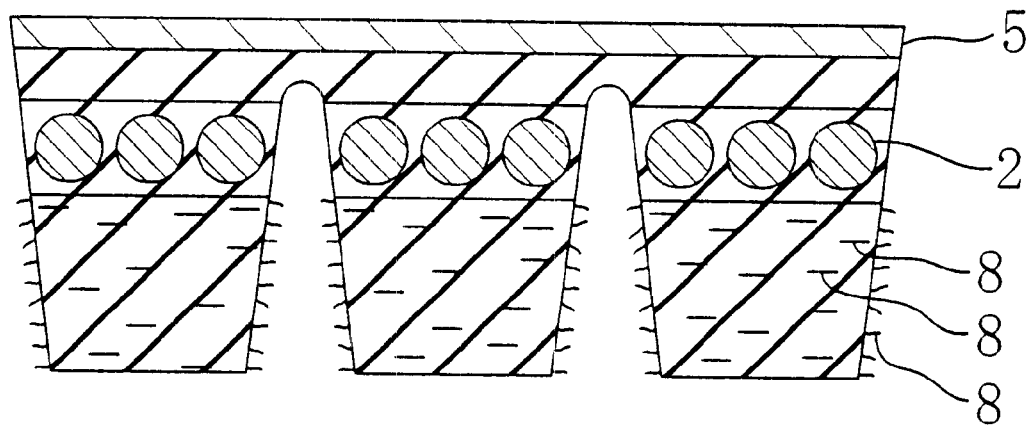
FIG. 18 is a cross-sectional view of a joined V-ribbed belt.
Figure 19:
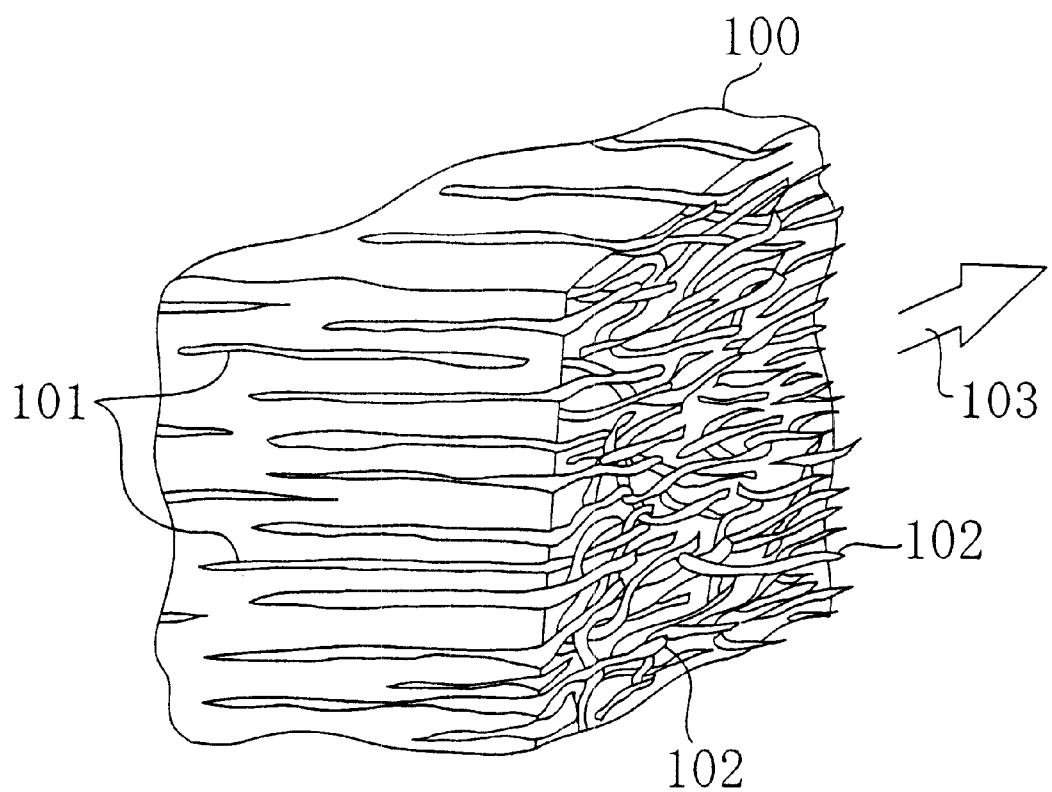
FIG. 19 is a view showing how a conventional power transmission belt has short aramid fibers extruded.

The present invention is not limited to the V-ribbed belts 10 as described in the above embodiments but may be V-ribbed belts of other types. For example, a joined V-ribbed belt 10A as shown in FIG. 18 is also applicable. Further, power transmission belts of other types such as V-belts are also applicable.

What is claimed is:

1. A power transmission belt in which a plurality of short fibers are mixed into a compression rubber thereof so as to be oriented in a given direction, some of the short fibers each having a protruded section extending from a surface of the compression rubber, wherein root portions of at least most of the short fibers are kept off of the surface of the compression rubber, and protruded sections of at least most of the short fibers are raised from the surface of the compression rubber and then bowed.

2. The power transmission belt of claim 1, wherein the protruded sections of the short fibers are bowed first in one direction and then another direction on the way from a root to a tip thereof.

3. The power transmission belt of claims 1 or 2, wherein at least the tip of the protruded sections of the short fibers are flattened.

4. The power transmission belt of claims 1 or 2, wherein the tip of the protruded sections of the short fibers are cracked by plastic deformation.

5. The power transmission belt of claims 1 or 2, wherein the protruded sections of the short fibers are different in bowing direction from one another to decentralize the orientation thereof.

6. The power transmission belt of claim 1 or 2, wherein the short fibers are made of para-aramid fibers or meta-aramid fibers.

\* \* \* \* \*